(12) United States Patent
Prakash et al.

(10) Patent No.: US 10,908,313 B2
(45) Date of Patent: Feb. 2, 2021

(54) ANTENNA DESIGNS FOR WELLBORE LOGGING TOOLS

(71) Applicant: Halliburton Energy Services, Inc., Houston, TX (US)

(72) Inventors: Anand Prakash, Tomball, TX (US); Alexei Korovin, Houston, TX (US); Michael J. Levchak, Tomball, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 72 days.

(21) Appl. No.: 16/306,274

(22) PCT Filed: Jul. 6, 2016

(86) PCT No.: PCT/US2016/041094
§ 371 (c)(1),
(2) Date: Nov. 30, 2018

(87) PCT Pub. No.: WO2018/009181
PCT Pub. Date: Jan. 11, 2018

(65) Prior Publication Data
US 2019/0154868 A1    May 23, 2019

(51) Int. Cl.
*G01V 3/28* (2006.01)
*E21B 47/12* (2012.01)
*E21B 47/26* (2012.01)
*G01V 3/30* (2006.01)

(52) U.S. Cl.
CPC ............... *G01V 3/28* (2013.01); *E21B 47/26* (2020.05); *G01V 3/30* (2013.01)

(58) Field of Classification Search
CPC .. G01V 3/28; G01V 3/30; E21B 47/12; E21B 47/122; E21B 47/011; E21B 47/26; E21B 47/124; E21B 49/00; E21B 49/003
See application file for complete search history.

(56) References Cited

U.S. PATENT DOCUMENTS

| | | | |
|---|---|---|---|
| 5,661,402 A * | 8/1997 | Chesnutt ................. | H01Q 1/04 324/338 |
| 7,436,183 B2 * | 10/2008 | Clark ....................... | E21B 47/13 324/338 |
| 7,525,315 B2 * | 4/2009 | Fredette .................. | E21B 47/01 324/339 |
| 8,400,154 B1 | 3/2013 | Olsson et al. | |
| 9,903,978 B2 | 2/2018 | Prakash et al. | |
| 10,027,013 B2 | 7/2018 | Korovin et al. | |
| 2004/0061622 A1 | 4/2004 | Clark | |
| 2004/0263414 A1 | 12/2004 | Chen et al. | |

(Continued)

OTHER PUBLICATIONS

International Search Report and Written Opinion for PCT/US2016/041094 dated Apr. 6, 2017.

*Primary Examiner* — Minh N Tang
(74) *Attorney, Agent, or Firm* — Benjamin Ford; C. Tumey Law Group PLLC

(57) ABSTRACT

An antenna assembly that includes a bobbin including arcuate first and second bobbin portions positioned about a tool mandrel. A protective layer is formed about the first and second bobbin portions, and a cover occludes a portion of an axially extending gap defined between the first and second bobbin portions to prevent the protective layer from extruding into the gap.

20 Claims, 10 Drawing Sheets

(56) References Cited

U.S. PATENT DOCUMENTS

2009/0179648 A1    7/2009   Fredette et al.
2015/0285068 A1   10/2015   Morris et al.
2017/0260845 A1    9/2017   Rashid et al.

* cited by examiner

US 10,908,313 B2

ANTENNA DESIGNS FOR WELLBORE LOGGING TOOLS

BACKGROUND

During drilling operations for the extraction of hydrocarbons, a variety of monitoring techniques are used to provide or record real-time data from the vicinity of a drill bit. Measurements of the surrounding subterranean formations may be made throughout drilling operations using downhole measurement and logging tools, such as measurement-while-drilling (MWD) and/or logging-while-drilling (LWD) tools, which help characterize the formations and aid in making operational decisions. Wellbore logging tools make measurements that may be used to determine the electrical resistivity (or its inverse, conductivity) of the formations being penetrated, where the electrical resistivity indicates various features of the formations. Those measurements may be taken using one or more antennas coupled to or otherwise associated with the wellbore logging tools.

Some logging tool antennas are formed by positioning a non-magnetic, non-conductive bobbin about an axial section of the logging tool, such as a drill collar, and subsequently wrapping a coil winding about the outer circumference of the bobbin. A protective layer is then often formed about the bobbin to secure the bobbin and the coil winding to the drill collar and protect the internal components of the antenna from potentially harmful downhole environments.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure relates generally to wellbore logging tools used in the oil and gas industry and, more particularly, to preventing the extrusion of a protective layer into gaps formed by a bobbin used in wellbore logging tools.

The embodiments of the antenna assemblies described herein help prevent failure of a protective layer during downhole use, where the protective layer forms a pressure barrier for the antenna assemblies. More specifically, the antenna assemblies described herein include a tool mandrel and a bobbin positioned about an outer surface of the tool mandrel. The bobbin includes a first arcuate bobbin portion and a second arcuate bobbin portion that cooperatively define an axially extending gap. A coil is wrapped about an outer circumference of the bobbin, and a protective layer is formed about the bobbin and the coil to provide a seal and pressure barrier. The protective layer is prevented from extruding into the axially extending gap using a variety of methods and means. In some cases, for instance, the size (width) of the axially extending gap may be constrained or limited. This may be done by choosing materials for the bobbin that have a coefficient of thermal expansion (CTE) the same as or less than a CTE of the tool mandrel, or alternatively by wrapping a cord about the outer circumference of the bobbin that constrains the bobbin against radial expansion. In other cases, the protective layer is prevented from extruding into the axially extending gap by occluding (i.e., covering) the axially extending gap with a cover that prevents or blocks the material of the protective layer from migrating into the gap.

Figure 1:
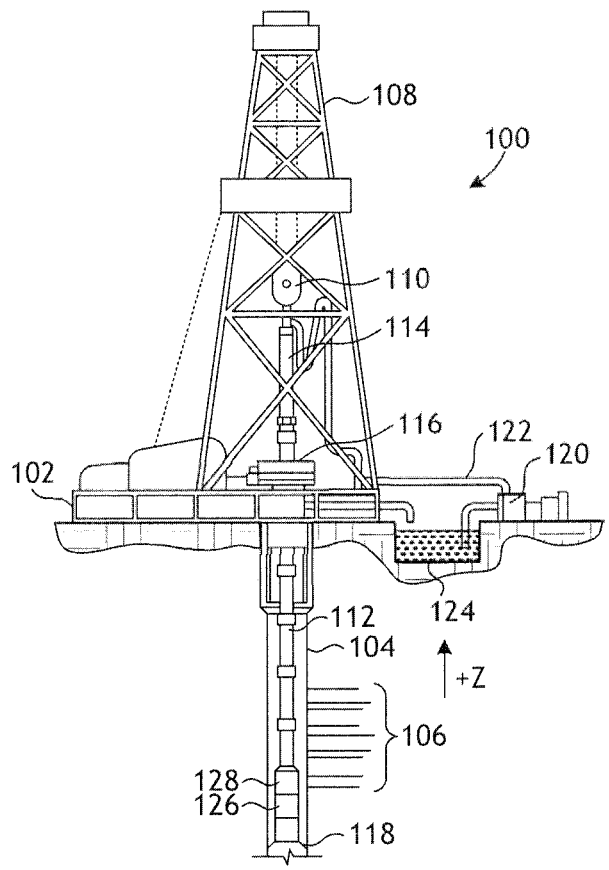
FIG. 1 is a schematic diagram of an exemplary drilling system that may employ the principles of the present disclosure.

FIG. 1 is a schematic diagram of an exemplary drilling system 100 that may employ the principles of the present disclosure, according to one or more embodiments. As illustrated, the drilling system 100 may include a drilling platform 102 positioned at the surface and a wellbore 104 that extends from the drilling platform 102 into one or more subterranean formations 106. In other embodiments, such as in an offshore drilling operation, a volume of water may separate the drilling platform 102 and the wellbore 104.

The drilling system 100 may include a derrick 108 supported by the drilling platform 102 and having a traveling block 110 for raising and lowering a drill string 112. A kelly 114 may support the drill string 112 as it is lowered through a rotary table 116. A drill bit 118 may be coupled to the drill string 112 and driven by a downhole motor and/or by rotation of the drill string 112 by the rotary table 116. As the drill bit 118 rotates, it creates the wellbore 104, which penetrates the subterranean formations 106. A pump 120 may circulate drilling fluid through a feed pipe 122 and the kelly 114, downhole through the interior of drill string 112, through orifices in the drill bit 118, back to the surface via the annulus defined around drill string 112, and into a retention pit 124. The drilling fluid cools the drill bit 118 during operation and transports cuttings from the wellbore 104 into the retention pit 124.

The drilling system 100 may further include a bottom hole assembly (BHA) coupled to the drill string 112 near the drill bit 118. The BHA may comprise various downhole measurement tools such as, but not limited to, measurement-while-drilling (MWD) and logging-while-drilling (LWD) tools, which may be configured to take downhole measurements of drilling conditions. The MWD and LWD tools may include at least one wellbore logging tool 126, which may comprise one or more antennas capable of receiving and/or transmitting one or more electromagnetic (EM) signals that are axially spaced along the length of the wellbore logging tool 126.

As the drill bit 118 extends the wellbore 104 through the formations 106, the wellbore logging tool 126 may continuously or intermittently collect azimuthally-sensitive measurements relating to the resistivity of the formations 106, i.e., how strongly the formations 106 opposes a flow of electric current. The wellbore logging tool 126 and other sensors of the MWD and LWD tools may be communicably coupled to a telemetry module 128 used to transfer measurements and signals from the BHA to a surface receiver (not shown) and/or to receive commands from the surface receiver. The telemetry module 128 may encompass any known means of downhole communication including, but not limited to, a mud pulse telemetry system, an acoustic telemetry system, a wired communications system, a wireless communications system, or any combination thereof. In certain embodiments, some or all of the measurements taken at the wellbore logging tool 126 may also be stored within the wellbore logging tool 126 or the telemetry module 128 for later retrieval at the surface upon retracting the drill string 112.

Figure 2:
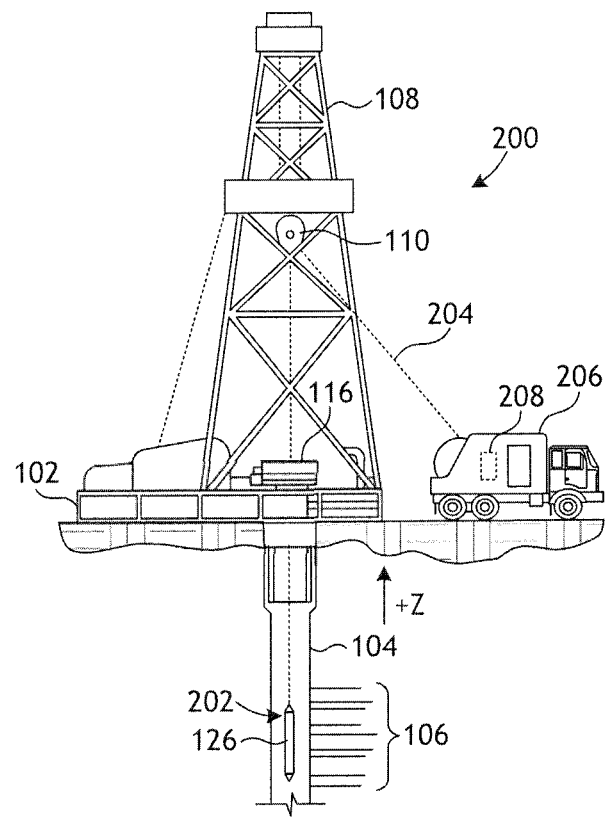
FIG. 2 is a schematic diagram of an exemplary wireline system that may employ the principles of the present disclosure.

At various times during the drilling process, the drill string 112 may be removed from the wellbore 104, as shown in FIG. 2, to conduct measurement/logging operations. More particularly, FIG. 2 depicts a schematic diagram of an exemplary wireline system 200 that may employ the principles of the present disclosure, according to one or more embodiments. Like numerals used in FIGS. 1 and 2 refer to the same components or elements and, therefore, may not be described again in detail. As illustrated, the wireline system 200 may include a wireline instrument sonde 202 that may be suspended into the wellbore 104 by a cable 204. The sonde is the portion of the logging tool that contains the measurement sensors. The wireline instrument sonde 202 and the wellbore logging tool 126 described above, which may be communicably coupled to the cable 204. The cable 204 may include conductors for transporting power to the wireline instrument sonde 202 and also facilitate communication between the surface and the wireline instrument sonde 202. A logging facility 206, shown in FIG. 2 as a truck, may collect measurements from the wellbore logging tool 126, and may include computing and data acquisition systems 208 for controlling, processing, storing, and/or visualizing the measurements gathered by the wellbore logging tool 126. The computing and data acquisition systems 208 may be communicably coupled to the wellbore logging tool 126 by way of the cable 204.

Figure 3A:
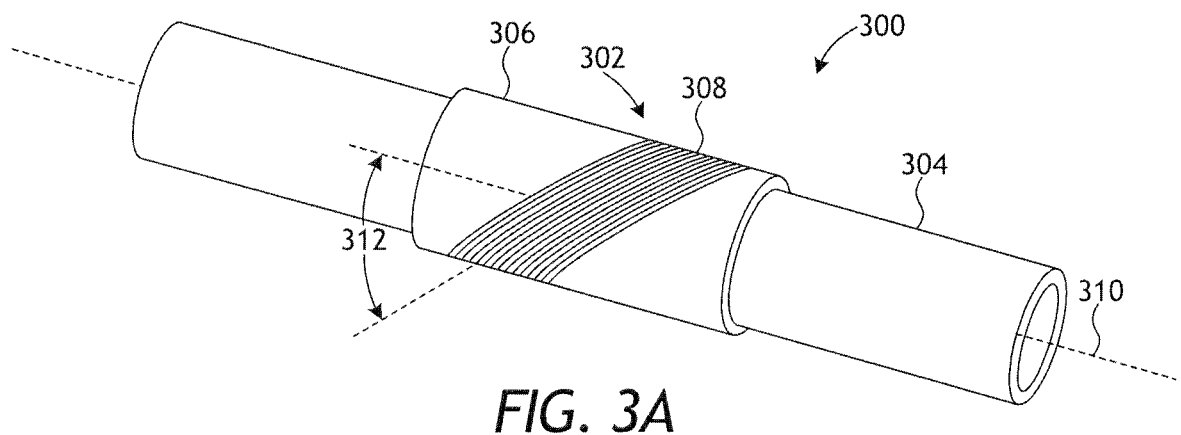
FIG. 3A is a partial isometric view of an exemplary wellbore logging tool.

FIG. 3A is a partial isometric view of an exemplary wellbore logging tool 300, according to one or more embodiments. The logging tool 300 may be the same as or similar to the wellbore logging tool 126 of FIGS. 1 and 2 and, therefore, may be used in the drilling or wireline systems 100, 200 depicted therein. The wellbore logging tool 300 is depicted as including an antenna assembly 302 that can be positioned about a tool mandrel 304, such as a drill collar or the like. The antenna assembly 302 may include a bobbin 306 and a coil 308 wrapped about the bobbin 306 and extending axially by virtue of winding along at least a portion of an outer surface of the bobbin 306.

The bobbin 306 may structurally comprise a high temperature plastic, a thermoplastic, a polymer (e.g., polyimide), a ceramic, or an epoxy material, but could alternatively be made of a variety of other non-magnetic, electrically insulating/non-conductive materials. The bobbin 306 can be fabricated, for example, by additive manufacturing (i.e., 3D printing), molding, injection molding, machining, or other known manufacturing processes.

The coil 308 can include any number of consecutive "turns" (i.e. windings of the coil 308) about the bobbin 306, but typically will include at least a plurality (i.e. two or more) consecutive full turns, with each full turn extending 360° about the bobbin 306. In some embodiments, a pathway for receiving the coil 308 may be formed along the outer surface of the bobbin 306. For example, one or more grooves may be defined in the outer surface of the bobbin 306 to receive and seat the coil 308. In other embodiments, however, the outer surface of the bobbin 306 may be smooth or even. The coil 308 can be concentric or eccentric relative to a central axis 310 of the tool mandrel 304.

As illustrated, the turns or windings of the coil 308 extend about the bobbin 306 at an angle 312 offset from the central axis 310. As a result, the antenna assembly 302 may be characterized and otherwise referred to as a "tilted coil" or "directional" antenna. In the illustrated embodiment, the angle 312 is 45°, by way of example, and could alternatively be any angle offset from the central axis 310, without departing from the scope of the disclosure.

Figure 3B:
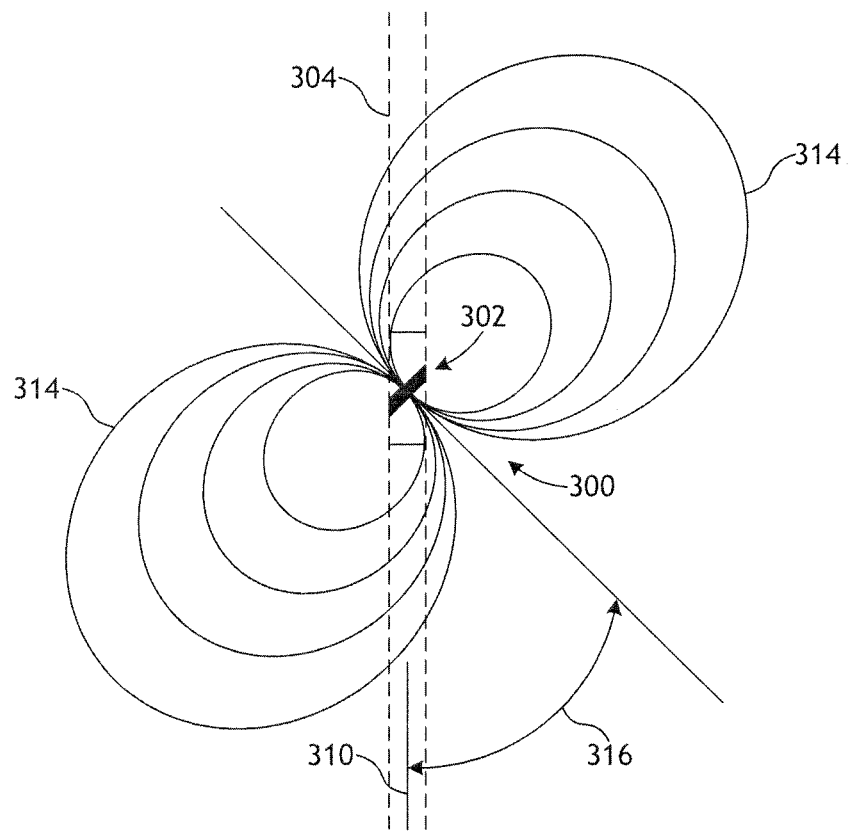
FIG. 3B is a schematic side view of the wellbore logging tool of FIG. 3A

FIG. 3B is a schematic side view of the wellbore logging tool 300 of FIG. 3A. When current is passed through the coil 308 of the antenna assembly 302, a dipole magnetic field 314 may be generated that extends radially outward from the antenna assembly 302 orthogonal to the winding direction. As a result, the antenna assembly 302 may exhibit a magnetic field angle 316 with respect to the tool mandrel 304 and, since the angle 312 (FIG. 3A) is 45°, the resulting magnetic field angle 316 will also be 45° offset from the central axis 310. As will be appreciated, however, the magnetic field angle 316 may be varied by adjusting or manipulating the angle 312.

Figure 4:
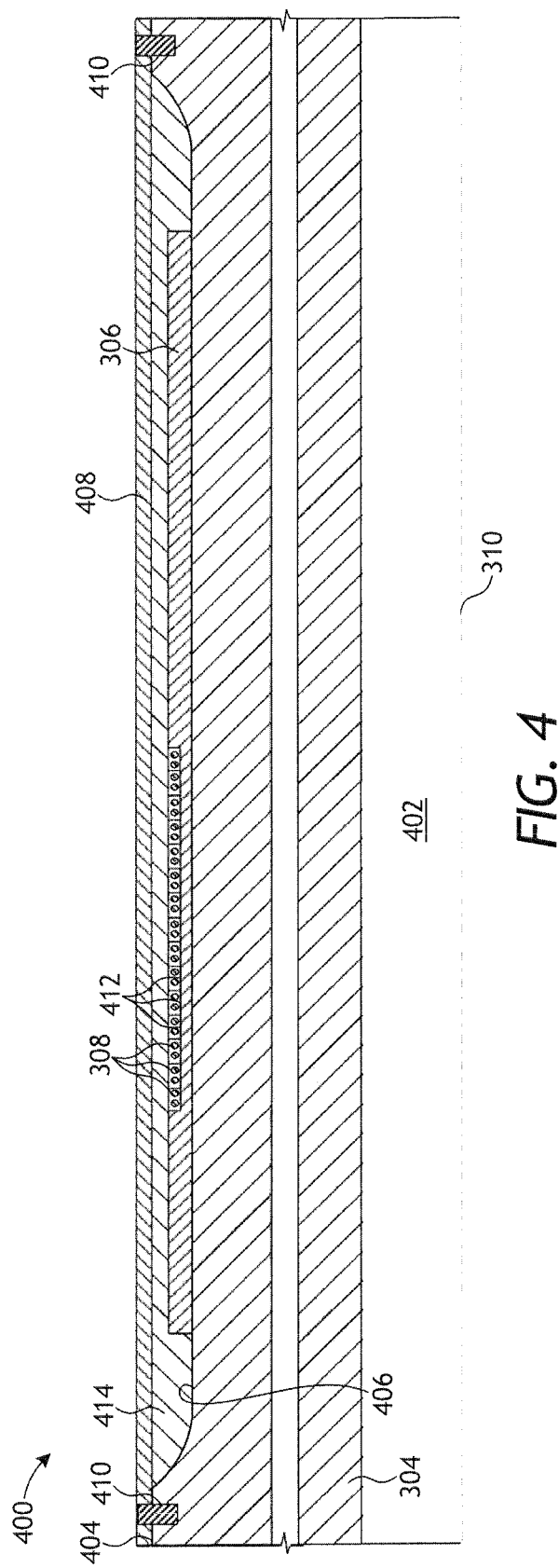
FIG. 4 is a cross-sectional side view of an exemplary antenna.

FIG. 4 is a cross-sectional side view of an exemplary antenna assembly 400, according to one or more embodiments. The antenna assembly 400 may be the same as or similar to the antenna assembly 302 of FIGS. 3A and 3B and therefore may be best understood with reference thereto, where like numerals will represent like elements or components that may not be described again in detail. In the illustrated embodiment, the tool mandrel 304 may comprise a generally cylindrical structure that provides an interior 402 (e.g., an inner flow passageway or hollow cavity) and an outer surface 404. A saddle 406 extends along a portion of the axial length of the tool mandrel 304 and generally comprises a reduced-diameter portion of the outer surface 404 as compared to remaining portions of the tool mandrel 304. In the illustrated embodiment, some or all of the components of the antenna assembly 400 may be positioned (arranged) within the saddle 406.

In some embodiments, the antenna assembly 400 may further provide an outer sleeve 408 that encapsulates or contains the various components of the antenna assembly 400 within the saddle 406. The outer sleeve 408 exhibits an inner diameter that is greater than an outer diameter of the tool mandrel 304 and a length sufficient to extend axially across the saddle 406. The outer sleeve 408 provides circumferential encapsulation by extending about the central axis 310 of the tool mandrel 304. The upper and lower ends of the outer sleeve 408 may be coupled to the outer surface 404 of the tool mandrel 304 at opposing axial ends of the saddle 406 via one or more mechanical fasteners 410 such as, but not limited to, snap rings, latches, bolts, screws, pins, or other suitable mechanical fasteners.

The outer sleeve 408 may comprise a nonconductive or nonmetallic material such as, but not limited to, fiberglass, a polymer or polymeric material (e.g., polyether ether ketone or "PEEK"), a nickel-based alloy, a chromium-based alloy, a copper-based alloy, INCONEL®, MONEL®, an advanced composite, and/or any combination thereof. As will be appreciated, different materials or combinations of materials can be provided in multiple layers to form the outer sleeve 408, without departing from the scope of the disclosure.

The bobbin 306 is depicted as being positioned within the saddle 406 and has an axial length sufficient to extend axially across a portion of the saddle 406. In some embodiments, as illustrated, the bobbin 306 may define a plurality of winding grooves 412 about its outer circumferential surface to receive and seat the several turns of the coil 308 wrapped about the bobbin 306. In other embodiments, however, the winding grooves 412 may be omitted and the outer surface of the bobbin 306 may otherwise be smooth.

In some embodiments, a ferritic material (not shown) in the form of a plurality of "ferrites" may radially interpose the bobbin 306 and the tool mandrel 304. The ferrites may be made of any ferritic or ferromagnetic material, such as iron or an iron-based alloy. The ferrites operate to shield the coil 308 from eddy currents that may be generated by the tool mandrel 304 during downhole operation, which increases the azimuthal sensitivity and/or the efficiency/field strength of the antenna assembly 400.

The antenna assembly 400 may further include a protective layer 414 formed (applied) about the outer circumference of the bobbin 306 within the saddle 406. The protective layer 414 may operate as a pressure barrier that secures the bobbin 306 within the saddle 406 and protects the internal components of the antenna assembly 400 from the ingress of downhole fluids. The material of the protective layer 414 can be any material capable of permitting propagation of signals from the antenna assembly 400 while simultaneously withstanding exposure to common wellbore fluids, such as drilling fluids, contaminants, oil, gas, etc. Moreover, the material of the protective layer 414 may also be capable of withstanding elevated temperatures and pressures common in downhole environments. For example, the protective layer 414 can be formed of a nonconductive and/or nonmetallic material, such as a rubber or elastomeric material, a polymer, or a polymeric material. In at least one embodiment, the protective layer 414 is made of a fluoropolymer elastomer, such as VITON®.

Figure 5:
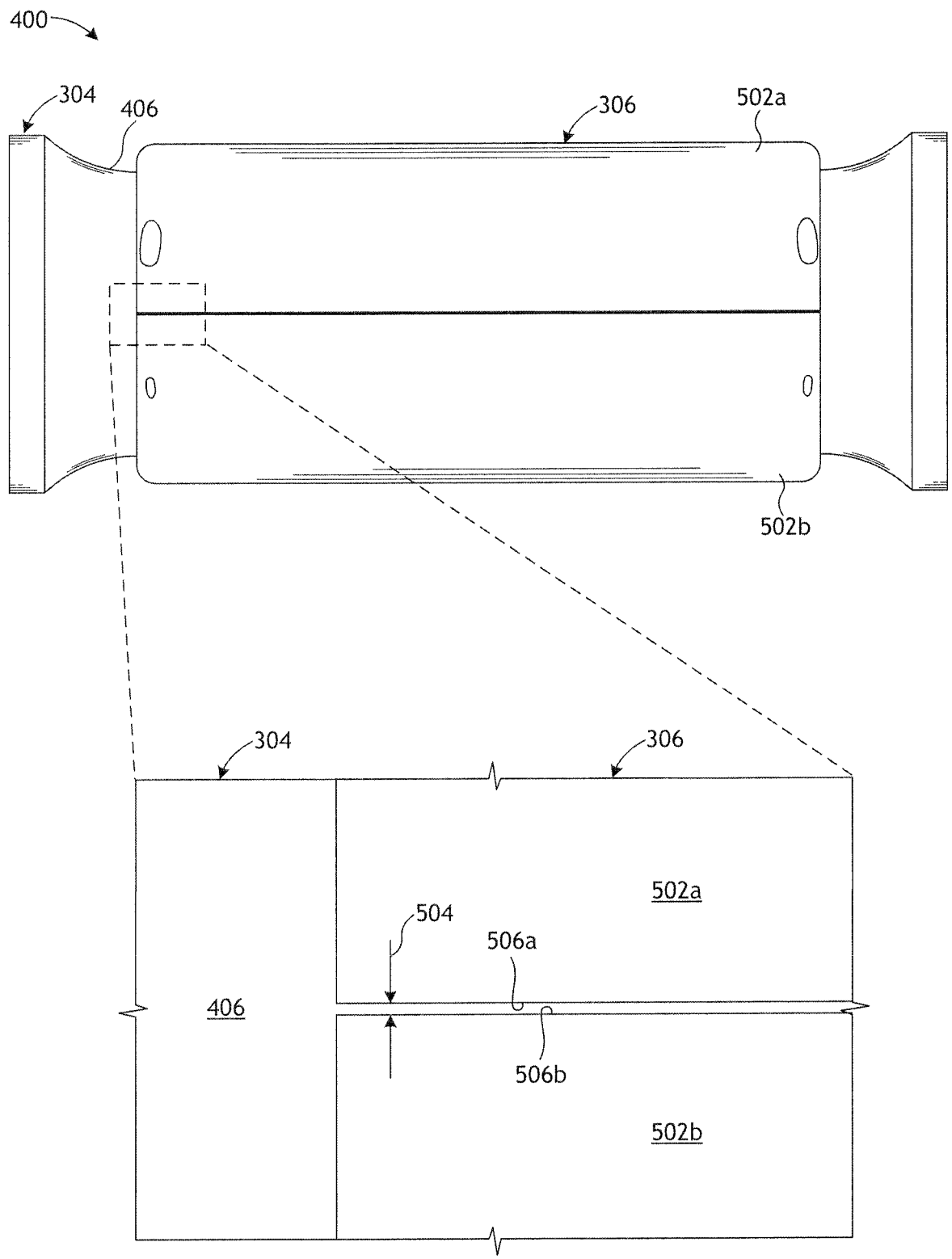
FIG. 5 is a side view of the antenna assembly of FIG. 4

FIG. 5 is a side view of the antenna assembly 400 of FIG. 4, excluding the coil 308, the outer sleeve 408, and the protective layer 414. More specifically, FIG. 5 shows an example embodiment of the bobbin 306 positioned about the tool mandrel 304 within the saddle 406. As illustrated, the bobbin 306 may comprise a multi-piece construction that includes at least a first arcuate bobbin portion 502a and a second arcuate bobbin portion 502b. As used herein, the term "arcuate" refers to a curved or bent structure having a substantially constant radius along its arc length. The arcuate first and second bobbin portions 502a,b each comprise an arced or arcuate section of the bobbin 306 and are cooperatively sized (e.g., radius and arc length) to extend around (about) the entire outer circumference of the tool mandrel 304 within the saddle 406.

The bobbin portions 502a,b generally form a type of "clamshell" construction enclosure, but may not necessarily be hinged at one of the opposing arc ends. While only two arcuate bobbin portions 502a,b are shown in FIG. 4, it will be appreciated that more than two bobbin portions may be employed, without departing from the scope of the disclosure.

As shown in the enlarged view, an axially extending gap 504 is defined between the first and second bobbin portions 502a,b when positioned about the tool mandrel 304. More particularly, the gap 504 is formed between juxtaposed (i.e., adjacent, opposing, etc.) arc ends 506a and 506b of the bobbin portions 502a,b, respectively. As used herein, the term "arc end" refers to the terminating location of the arc length of the bobbin portions 502a,b on either extreme of the arc length. While not shown, a second axially-extending gap is formed between the first and second bobbin portions 502a,b on the opposite side of the tool mandrel 304 and otherwise between the opposing arc ends of the bobbin portions 502a,b provided on the opposite arc length extreme.

During downhole operation, the antenna assembly 400 can be subjected to extreme pressure and temperature conditions. Since the tool mandrel 304 and the bobbin 306 are generally made of different materials that exhibit different coefficients of thermal expansion (CTE), each component will behave differently in the downhole environment. The tool mandrel 304, for example, may be made of steel, which has a different CTE as compared to the materials used for the bobbin 306 (e.g., a plastic, a thermoplastic, a polymer, etc.). Consequently, upon exposure to elevated downhole temperatures, the tool mandrel 304 will thermally expand and correspondingly force the bobbin 306 surrounding the tool mandrel 304 to radially expand. As the bobbin 306 radially expands, the size (width) of the gap 504 between the opposing bobbin portions 502a,b increases and allows the material of the protective layer 414 (FIG. 4) to extrude and otherwise migrate into the widened gap 504 under elevated downhole pressures. As it extrudes into the gap 504, the protective layer 414 can fail (e.g., tear, shear, etc.) and thereby expose the internal components of the antenna assembly 400 to downhole fluids, which may short out or otherwise damage the antenna assembly 400.

According to embodiments of the present disclosure, various methods and means may be employed to help prevent or mitigate extrusion of the protective layer 414 (FIG. 4) into the gap 504 between the bobbin portions 502a,b during operation. For instance, some example methods and means may be employed to constrain or limit the size of the gap 504 during operation. Alternatively, the gap 504 may be occluded (i.e., covered) with a type of covering that operates to prevent the material of the protective layer 414 from migrating into the gap 504.

In some embodiments, one example method of constraining or limiting the size of the gap 504 during operation includes selecting the materials used for the tool mandrel 304 and the bobbin 306 such that the size (width) of the gap 504 does not increase or significantly increase during thermal expansion. In such embodiments, the materials selected for the tool mandrel 304 and the bobbin 306 may exhibit a similar or substantially similar CTE. For example the tool mandrel 304 may be made of a nickel based alloy (or any non-magnetic metal), and the bobbin 306 may be made of a composite material (e.g., G10 fiberglass composite, G11 glass epoxy laminate material, or any other advanced composite). Alternatively, the material used for the bobbin 306 may be selected to exhibit the same or lower CTE than what would typically be used for an antenna bobbin and otherwise a CTE that is closer to that of the tool mandrel 304. For example, the bobbin 306 may be made of a thermoplastic, fiberglass, or another type of composite material that exhibits a similar or lower CTE as compared to the tool mandrel 304.

Figure 6A:
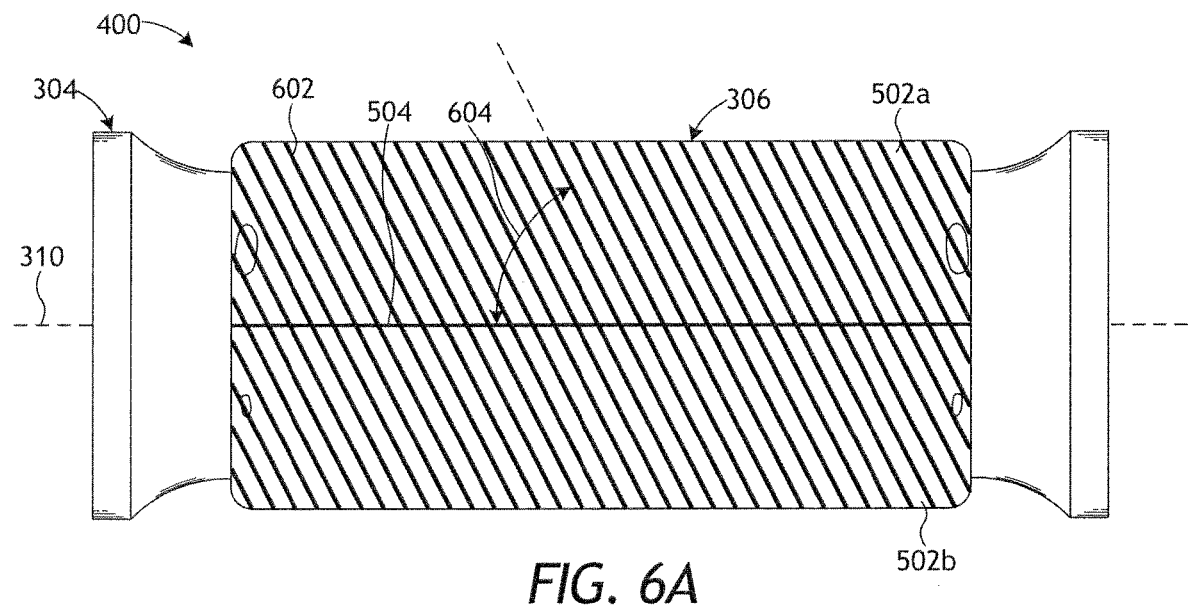
FIGS. 6A-6C are side views of alternative embodiments of the antenna assembly of FIG. 4 that constrain a size of the gap between the first and second bobbin portions of the bobbin.
Figure 6B:
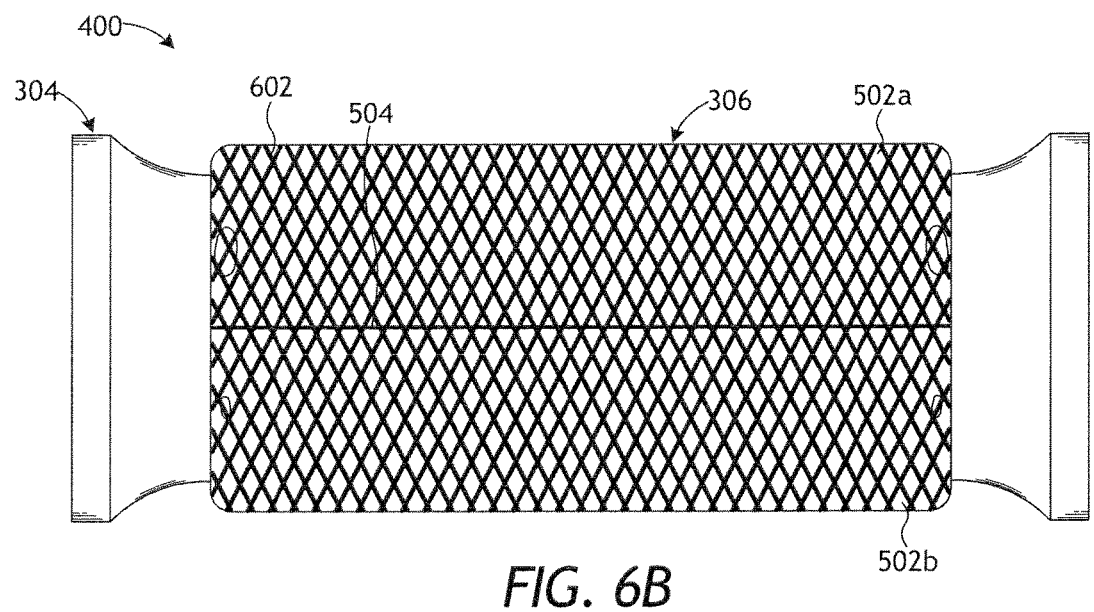
Figure 6C:
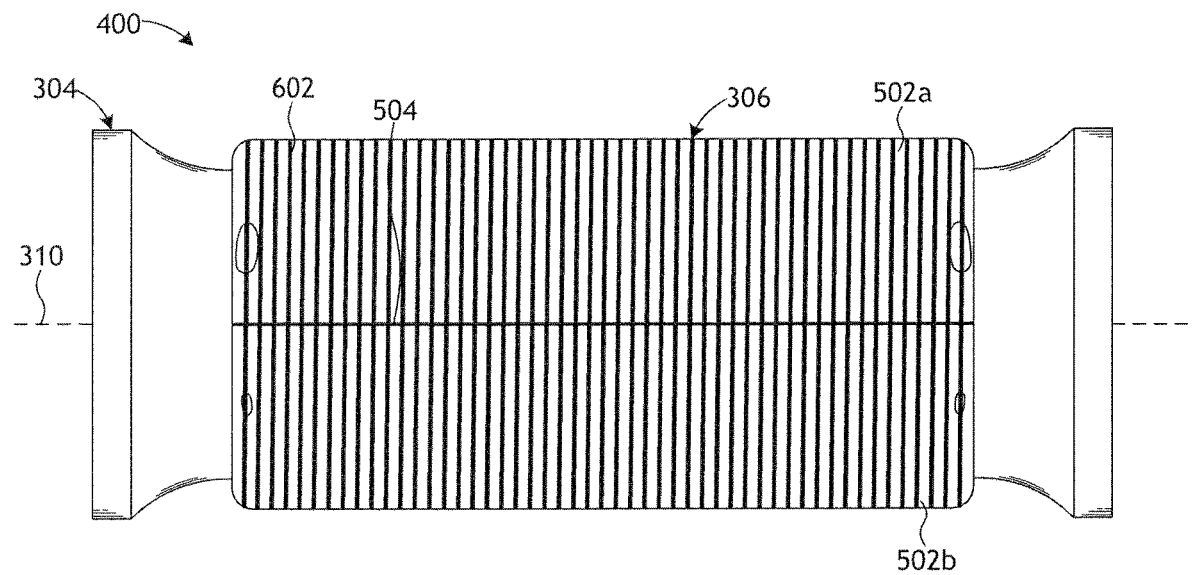

FIGS. 6A-6C are side views of alternative embodiments of the antenna assembly 400 that may be employed to constrain or limit the size of the gap 504 between the arcuate first and second bobbin portions 502a,b of the bobbin 306. For ease of viewing the several embodiments, the coil 308 (FIG. 4), the outer sleeve 408 (FIG. 4), and the protective layer 414 (FIG. 4) are again omitted from FIGS. 6A-6C. In the illustrated embodiments, a cord 602 is wrapped about the outer circumference of the bobbin 306 one or more times and used to help radially constrain the bobbin portions 502a,b and thereby limit the expansion potential of the gap 504 as the tool mandrel 304 thermally expands and urges the bobbin 306 to radially expand.

The cord 602 may be made of a material that exhibits a CTE that is lower than the CTE for the materials used for each of the tool mandrel 304 and the bobbin 306. In such embodiments, as the temperature in the downhole environment increases, the cord 602 will thermally grow (expand) at a slower rate as compared to the tool mandrel 304 and the bobbin 306, which operates to constrain the bobbin portions 502a,b against radial expansion and prevents the gap 504 from widening. In at least one embodiment, the CTE of the cord 602 may be negative (i.e., the material shrinks with increased temperature). In such embodiments, as the temperature in the downhole environment increases, the cord 602 may shrink to constrain the bobbin portions 502a,b and prevent the gap 504 from widening. One suitable example material that may be used for the cord 602 is a para-aramid synthetic fiber, also known as KEVLAR®. Other example materials that may be used for the cord 602 include, but are not limited to, polybenzimidazole, polybenzothiazole, and a composite material that incorporates a filler (e.g., boron nitride, diamond, carbon fibers, etc.) to reduce the CTE of the cord 602.

The cord 602 may be wrapped about the outer circumference of the bobbin 306 in any number of ways and/or designs and as many times as desired to help constrain the bobbin portions 502a,b against radial expansion. In FIG. 6A, for instance, the cord 602 is shown wrapped about the outer circumference of the bobbin 306 at an angle 604 (e.g., tilted) relative to the central axis 310 of the tool mandrel 304. The angle 604 depicted in FIG. 6A is approximately 45°, but could alternatively range anywhere from 1° to 89° relative to the central axis 310, without departing from the scope of the disclosure. Moreover, the cord 602 in FIG. 6A is shown wrapped about the outer circumference of the bobbin 306 without overlapping any successive or adjacent portions of the cord 602, but could alternatively be wrapped multiple times to overlap adjacent portions of the cord 602. In some embodiments, the cord 602 may be wrapped to form multiple radially disposed layers of the cord 602 about the outer circumference of the bobbin 306.

In FIG. 6B, the cord 602 is wrapped about the outer circumference of the bobbin 306 in a diamond-shaped pattern. The cord 602 may comprise a single strand (i.e., single fiber) or may alternatively comprise multiple strands wrapped about the bobbin 306 to form the desired diamond-shaped pattern. It will be appreciated, however, that other patterns may be employed, without departing from the scope of the disclosure. For example, in other embodiments, the cord 602 may alternatively be wrapped about the outer circumference of the bobbin 306 helically or in a helical fashion. Moreover, the pattern may be repeated as desired to form multiple radially disposed layers about the outer circumference of the bobbin 306.

In FIG. 6C, the cord 602 is depicted as wrapped about the outer circumference of the bobbin 306 generally perpendicular to the central axis 310 of the tool mandrel 304. Again, the cord 602 may comprise a single strand (i.e., single fiber) or may alternatively comprise multiple strands wrapped about the bobbin 306. Moreover, while the cord 602 in FIG. 6C is shown wrapped about the outer circumference of the bobbin 306 without overlapping any successive or adjacent portions of the cord 602, it is contemplated herein to overlap portions of the cord 602 and thereby form multiple radially-disposed layers of the cord 602.

Figure 7A:
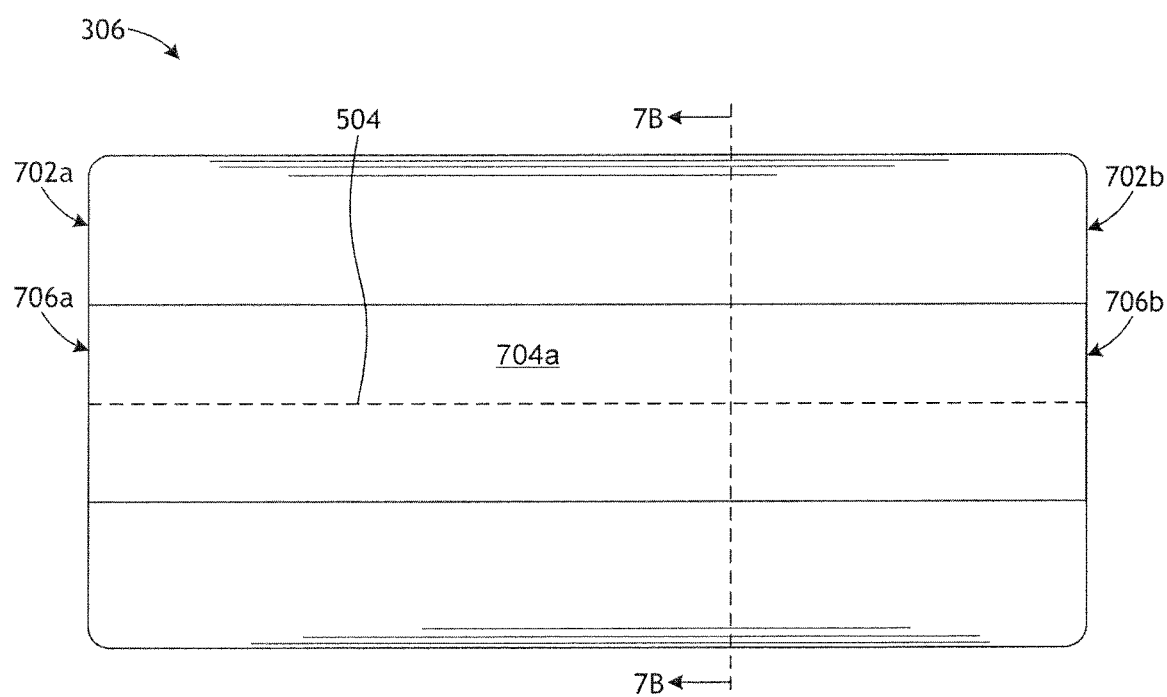
FIG. 7A is a side view of an embodiment of the bobbin of FIG. 4.

FIG. 7A is a side view of an example embodiment of the bobbin 306 of FIG. 4, according to one or more embodiments of the disclosure. The bobbin 306 includes a first axial end 702a and a second axial end 702b opposite the first axial end 702a, and a first gap 504a (shown in dashed linetype) extends axially between the first and second axial ends 702a,b. In the illustrated embodiment, a first cover 704a is positioned on the bobbin 306 and used to occlude (i.e., cover) the first gap 504a formed between the arcuate first and second bobbin portions 502a,b. While not shown, a second cover 704b (FIG. 7B) may be positioned on the angularly opposite side of the bobbin 306 to cover a second gap 504b (FIG. 7B) formed between the first and second bobbin portions 502a,b 180° offset from the first gap 504a. With the gaps 504a,b covered with the covers 704a,b, the material of the protective layer 414 (FIG. 4) may be prevented and otherwise blocked from extruding into the respective gaps 504a,b.

The cover 704a includes a first axial end 706a and a second axial end 706b opposite the first axial end 706a. In some embodiments, the axial ends 706a,b of the cover 704a extend to rest flush with the axial ends 702a,b of the bobbin 306, but alternatively the axial length of the cover 704a may be shorter than that of the bobbin 306, without departing from the scope of the disclosure.

Figure 7B:
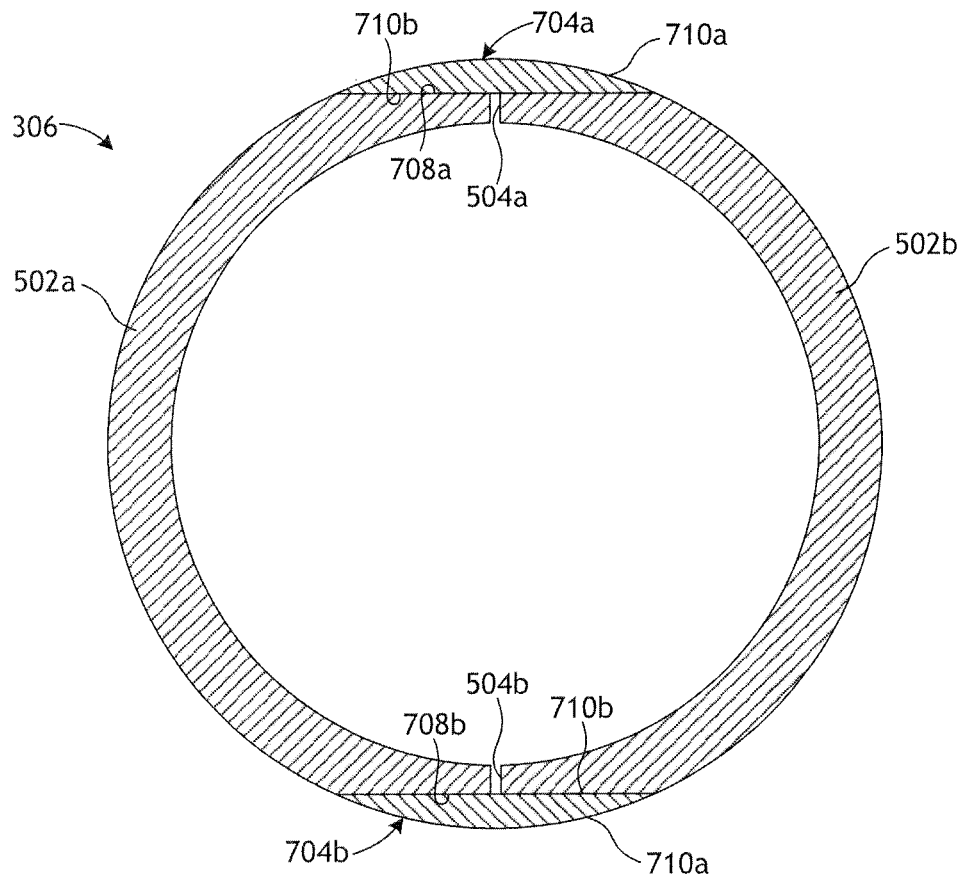
FIG. 7B is a cross-sectional end view of the bobbin of FIG. 7A as taken along the lines 7B-7B in FIG. 7A.

FIG. 7B is a cross-sectional end view of the bobbin 306 of FIG. 7A as taken along the lines 7B-7B shown in FIG. 7A. As illustrated, the first and second bobbin portions 502a,b form and otherwise define the first axially extending gap 504a and a second axially extending gap 504b, where the first and second gaps 504a,b are 180° offset from each other. In other embodiments, however, as mentioned above, the bobbin 306 may include more than two bobbin portions 502a,b. In such embodiments, more than two axially extending gaps may be formed.

In the illustrated embodiment, the first cover 704a is used to occlude the first gap 504a and a second cover 704b is used to occlude the second gap 504b and thereby prevent the protective layer 414 (FIG. 4) from extruding into the gaps 504a,b. The covers 704a,b may be made of any non-magnetic, electrically insulating, and/or non-conductive material that exhibits a CTE that is the same as or less than the CTE of the bobbin 306. Example materials that may be used for the covers 704a,b include, but are not limited to, a non-magnetic metal (e.g., 718 INCONEL®, a beryllium copper alloy, such as TOUGHMET®, a nickel-based alloy, a chromium-based alloy, a copper-based alloy, etc.), a high temperature plastic, a thermoplastic, a polymer (e.g., a polyimide, polyether ether ketone or "PEEK"), a ceramic, an epoxy material, a composite material (e.g., fiberglass), an advanced composite, or any combination thereof.

The bobbin 306 may provide or define a first longitudinal channel 708a configured (sized) to receive and seat the first cover 704a and a second longitudinal channel 708b configured to receive and seat the second cover 704b. The first and second longitudinal channels 708a,b exhibit a geometry configured to accommodate the first and second covers 704a,b. As illustrated, portions of each of the first and second longitudinal channels 708a,b are defined by both bobbin portions 502a,b of the bobbin 306 and extend across the gaps 504a,b. In the illustrated embodiment, the longitudinal channels 708a,b are formed by milling portion of the outer surface of the bobbin portions 502a,b at the first and second gaps 504a,b, respectively, but could alternatively be formed by other means or processes.

The covers 704a,b may be received within and/or secured to the longitudinal channels 708a,b via a variety of means or methods. In some embodiments, for example, one or both of the covers 704a,b may be positioned in/on the corresponding longitudinal channel 708a,b and free floating relative to the bobbin 306. In such embodiments, wrapping the coil 308 (FIGS. 3A and 4) or the cord 602 (FIGS. 6A-6C), or both about the outer circumference of the bobbin 306 may help secure the covers 704a,b to the bobbin 306 for operation. In other embodiments, however, one or both of the covers 704a,b may be secured to the corresponding longitudinal channels 708a,b using an epoxy or another type of industrial adhesive. In yet other embodiments, one or both of the covers 704a,b may be secured to the corresponding longitudinal channels 708a,b using one or more mechanical fasteners, such as screws, bolts, dowel pins, keys, snap rings, etc. In even further embodiments, one or both of the covers 704a,b may be secured to the corresponding longitudinal channels 708a,b using a combination of any of the foregoing means.

The covers 704a,b may each provide or define an outer surface 710a and an opposing inner surface 710b. In some embodiments, as illustrated, the outer surface 710a may exhibit a curvature (i.e., radius) similar to or the same as the curvature of the bobbin portions 502a,b. Consequently, once the covers 704a,b are positioned in/on the longitudinal channels 708a,b, respectively, the curvature of the bobbin 306 about its entire outer circumference may be generally uniform. In other embodiments, however, the outer surface 710a of one or both of the covers 704a,b may not be curved or alternatively may exhibit a curvature that is different than that of the bobbin portions 502a,b, without departing from the scope of the disclosure.

In some embodiments, as illustrated, the inner surface 710b of one or both of the covers 704a,b may be flat or planar and configured to rest against a corresponding flat or planar outer surface of the longitudinal channels 708a,b. In other embodiments, however, as discussed below, the inner surface 710b may have non-planar features.

Accordingly, the covers 704a,b may each operate as a bridge-like device that extends between the first and second bobbin portions 502a,b and across the gaps 504a,b to thereby occlude the gaps 504a,b. During operation, as the bobbin 306 radially expands during thermal expansion and the gaps 504a,b correspondingly widen (enlarge), the covers 704a,b will operate to occlude the gaps 504a,b and thereby prevent the protective layer 414 (FIG. 4) from extruding into the gaps 504a,b under elevated downhole pressures.

Figure 7C:
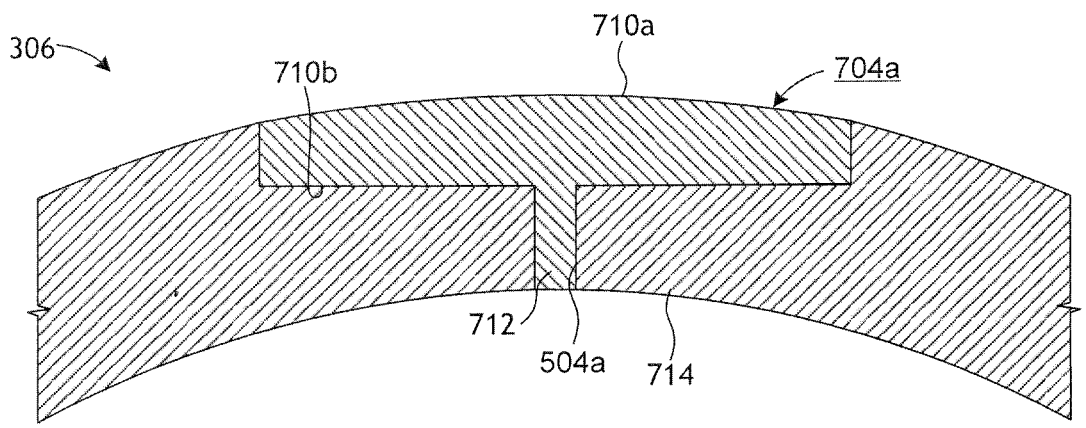
FIG. 7C is an enlarged cross-sectional end view of an alternative embodiment of the bobbin of FIG. 7A.

FIG. 7C is an enlarged cross-sectional end view of an alternative embodiment of the bobbin 306 of FIG. 7A. In the illustrated embodiment, the first cover 704a exhibits a generally "T" shaped cross-section. More specifically, the outer surface 710a of the cover 704a may be generally curved, as discussed above, but the inner surface 710b may be non-planar and otherwise include a radial extension 712 sized and otherwise configured to be received within the first gap 504a. In some embodiments, as illustrated, the radial extension 712 may extend radially from the inner surface 710b and stop flush with the inner radial surface 714 of the bobbin 306. In other embodiments, however, the radial extension 712 may extend radially from the inner surface 710b and terminate before reaching the inner radial surface 714 of the bobbin 306. Moreover, in some embodiments, the radial extension 712 may extend radially into the gap 504a and extend longitudinally within all or only a portion of the axial length of the gap 504a between the first and second axial ends 702a,b (FIG. 7A) of the bobbin 306.

Figure 7D:
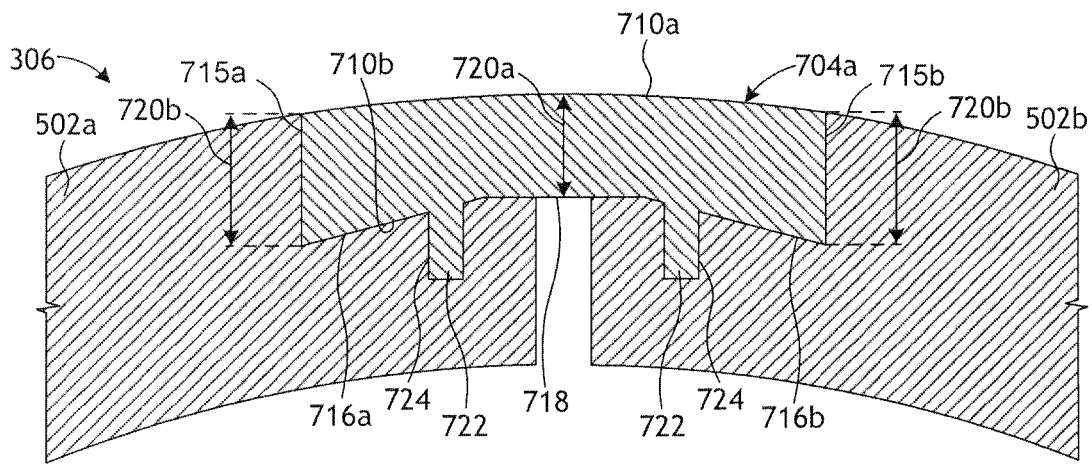
FIG. 7D is an enlarged cross-sectional end view of another alternative embodiment of the bobbin of FIG. 7A.

FIG. 7D is an enlarged cross-sectional end view of another alternative embodiment of the bobbin 306 of FIG. 7A. In the illustrated embodiment, the cover 704a provides a generally curved outer surface 710a, as discussed above, but the inner surface 710b may again be non-planar (not flat). More specifically, the cover 704a may include a first side 715a and a second side 715b opposite the first side 715a. A first angled portion 716a may be provided by or otherwise defined at the first side 715a, a second angled portion 716b may be provided by or otherwise defined at the second first side 715b, and a planar portion 718 may be defined between the first and second angled portions 716a,b. The planar portion 718 exhibits a first thickness 720a while the first and second angled portions 716a,b may each exhibit a second thickness 720b larger than the first thickness 720a. The first and second angled portions 716a,b may each extend radially inward relative to the planar portion 718 and thereby help hold the bobbin portions 502a,b against radial expansion.

In some embodiments, the inner surface 710b may be castellated and otherwise provide one or more castellations 722 (two shown) that extend radially inward from the inner surface 710b. The castellations 722 may be received within corresponding cavities 724 defined in the first longitudinal channel 708a. Similar to the first and second angled portions 716a,b, the castellations 722 may help hold the bobbin portions 502a,b against radial expansion.

Figure 8:
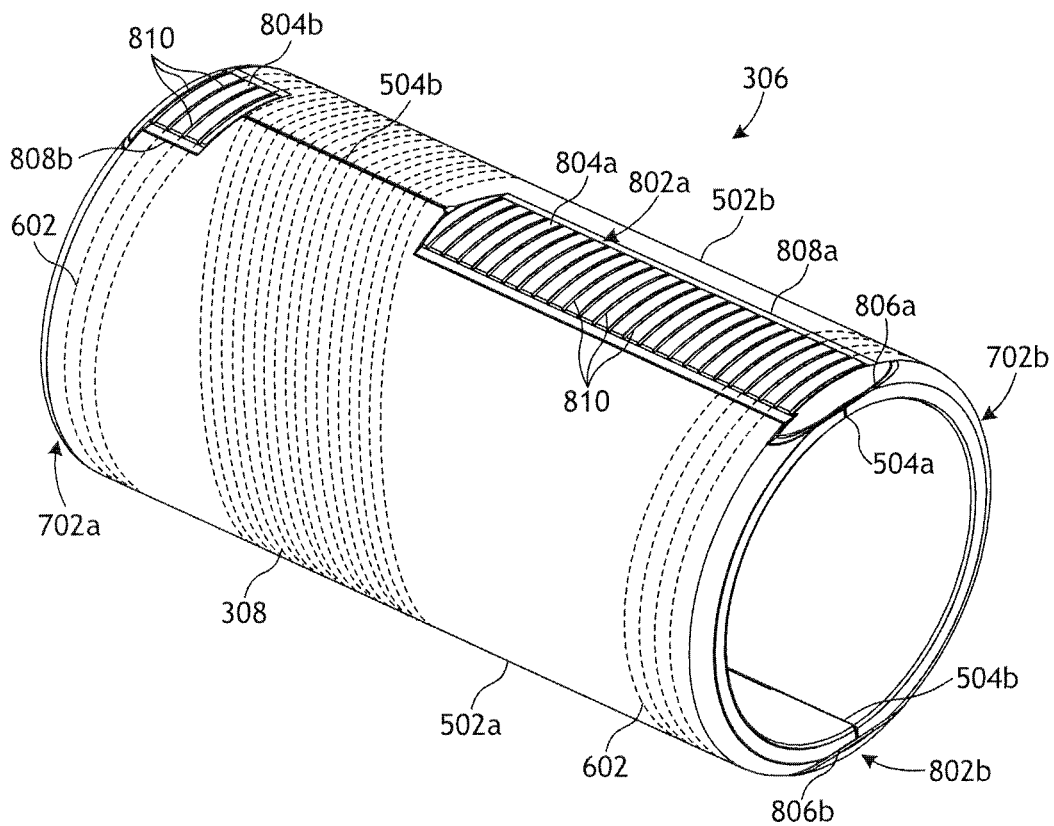
FIG. 8 is an isometric view of another example embodiment of the bobbin of FIG. 4, according to one or more embodiments of the disclosure. In the illustrated embodiment

FIG. 8 is an isometric view of another example embodiment of the bobbin 306 of FIG. 4, according to one or more embodiments of the disclosure. In the illustrated embodiment, the arcuate first and second bobbin portions 502a,b form the first gap 504a and the second gap 504b 180° offset from the first gap 504a, and the first and second gaps 504a,b extend axially between the first and second axial ends 702a,b of the bobbin 306. The coil 308 (shown in dashed linetype) is wrapped about the bobbin 306 and extends axially by virtue of winding along a portion of the outer surface of the bobbin 306 and thereby occludes (covers) a portion of the first gap 504a (and the second gap 504b, although not shown in FIG. 8). As illustrated, the coil 308 is wrapped about the bobbin 306 so as to provide a "tilted coil" or "directional" antenna, as described above.

Similar to the bobbin 306 shown in FIG. 7B, the bobbin 306 of FIG. 8 includes a first cover 802a used to at least partially occlude the first gap 504a and a second cover 802b used to at least partially occlude the second gap 504b and thereby prevent the protective layer 414 (FIG. 4) from extruding into the gaps 504a,b during downhole operation. The covers 802a,b may also be made of similar materials as the first and second covers 704a,b of FIG. 7B. Unlike the first and second covers 704a,b of FIG. 7B, however, one or both of the first and second covers 802a,b may comprise a two-piece construction including a first cover portion 804a and a second cover portion 804b. The first and second cover portions 804a,b each occlude (cover) separate or axially separated portions of the first and second gaps 504a,b, respectively. In the illustrated embodiment, for example the coil 308 axially interposes the first and second cover portions 804a,b and serves to occlude portions of the gap 504a,b between the first and second cover portions 804a,b. In some embodiments, for example, the coil 308 may comprise multiple winding layers across the corresponding portions of the gaps 504a,b. Consequently, the coil 308 may effectively occlude (cover) the corresponding portions of the gaps 504a,b not covered by the first and second cover portions 804a,b of each cover 802a,b and effectively prevent the protective layer 414 (FIG. 4) from extruding into the gaps 504a,b at that location during downhole operation.

The bobbin 306 may provide or define a first longitudinal channel 806a configured (sized) to receive the first cover 802a and a second longitudinal channel 806b configured to receive the second cover 802b. One or both of the first and second longitudinal channels 806a,b may provide or define a first channel portion 808a and a second channel portion 808b configured to receive the first and second cover portions 804a,b, respectively. In some embodiments, the covers 802a,b may be secured to the longitudinal channels 806a,b for operation by wrapping the cord 602 (shown only partially extending along the axial length of the bobbin 306 in dashed linetype) about the outer circumference of the bobbin 306. In such embodiments, the outer radial surface of one or both of the first and second cover portions 804a,b may define a plurality of grooves 810 used to receive and seat the cord 602. The cord 602 may be wrapped about the bobbin 602 in any of the designs or configurations mentioned herein.

In other embodiments, however, one or both of the covers 802a,b may be secured to the corresponding longitudinal channels 806a,b using an epoxy or other industrial adhesive. In yet other embodiments, one or both of the covers 802a,b may be secured to the corresponding longitudinal channels 806a,b using one or more mechanical fasteners, such as screws, bolts, dowel pins, keys, snap rings, etc. In even further embodiments, one or both of the covers 802a,b may be secured to the corresponding longitudinal channels 806a,b using a combination of any of the foregoing means.

Figure 9A:
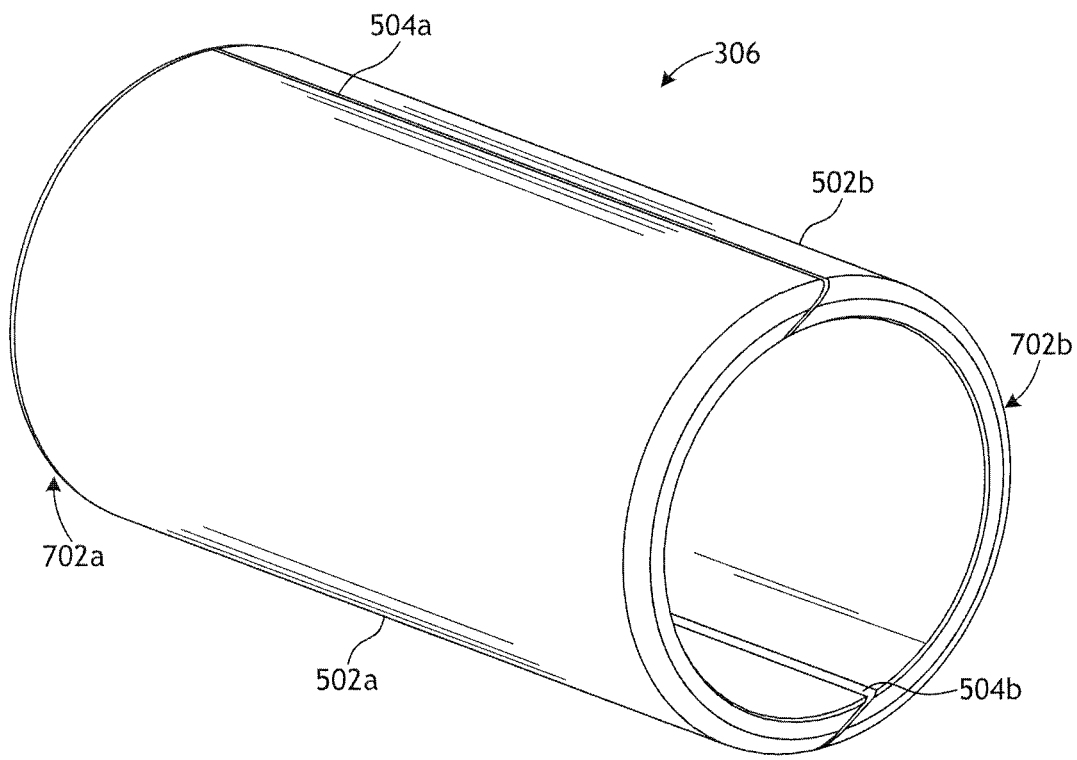
FIG. 9A is an isometric view of another example embodiment of the bobbin of FIG. 4.

FIG. 9A is an isometric view of yet another example embodiment of the bobbin 306 of FIG. 4, according to one or more embodiments of the disclosure. In the illustrated embodiment, the arcuate first and second bobbin portions 502a,b form the first gap 504a and the second gap 504b 180° offset from the first gap 504a, and the first and second gaps 504a,b extend axially between the first and second axial ends 702a,b of the bobbin 306. Unlike the first and second gaps 504a,b of FIGS. 7B and 8, however, the opposing arc ends of the bobbin portions 502a,b at the first and second gaps 504a,b overlap in the radial direction. More specifically, the first and second gaps 504a,b of FIG. 9A are formed and otherwise defined as a skive cut (alternately referred to as a "scarf" cut) through the body of the bobbin 306.

Figure 9B:
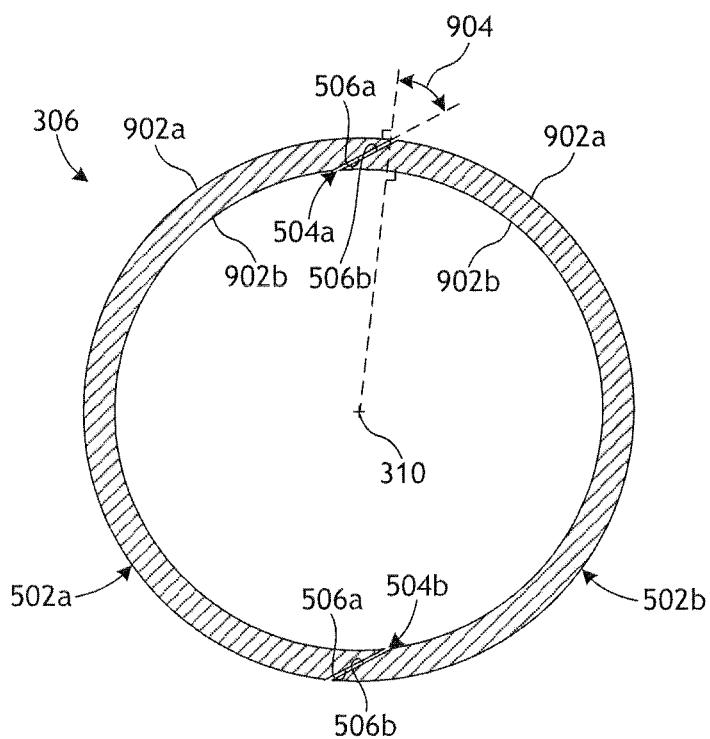
FIG. 9B is a cross-sectional end view of the bobbin of FIG. 9A.

FIG. 9B is a cross-sectional end view of the bobbin 306 of FIG. 9A. The first and second gaps 504a,b may extend between an outer radial surface 902a of the bobbin 306 and an inner radial surface 902b of the bobbin 306 at an angle 904 offset from perpendicular to the inner and outer radial surfaces 902a,b and otherwise in a plane that does not pass through the central axis 310. Consequently, the opposing arc ends 506a,b are angled such that they overlap in the radial direction. This may prove advantageous during operation since, as the bobbin 306 radially expands and the gaps 504a,b begin to separate, the overlapping angled arc ends 506a,b will continue to occlude the gaps 504a,b in the radial direction, and thereby prevent the protective layer 414 (FIG. 4) from extruding into the gaps 504a,b.

In contrast, the first and second gaps 504a,b of FIGS. 7B and 8 extend between the inner and outer radial surfaces 902a,b in a plane that passes through the central axis 310 and otherwise substantially perpendicular to the inner and outer radial surfaces 902a,b. In such embodiments, there is no radial overlap at the arc ends 506a,b of the bobbin portions 502a,b.

Figure 10A:
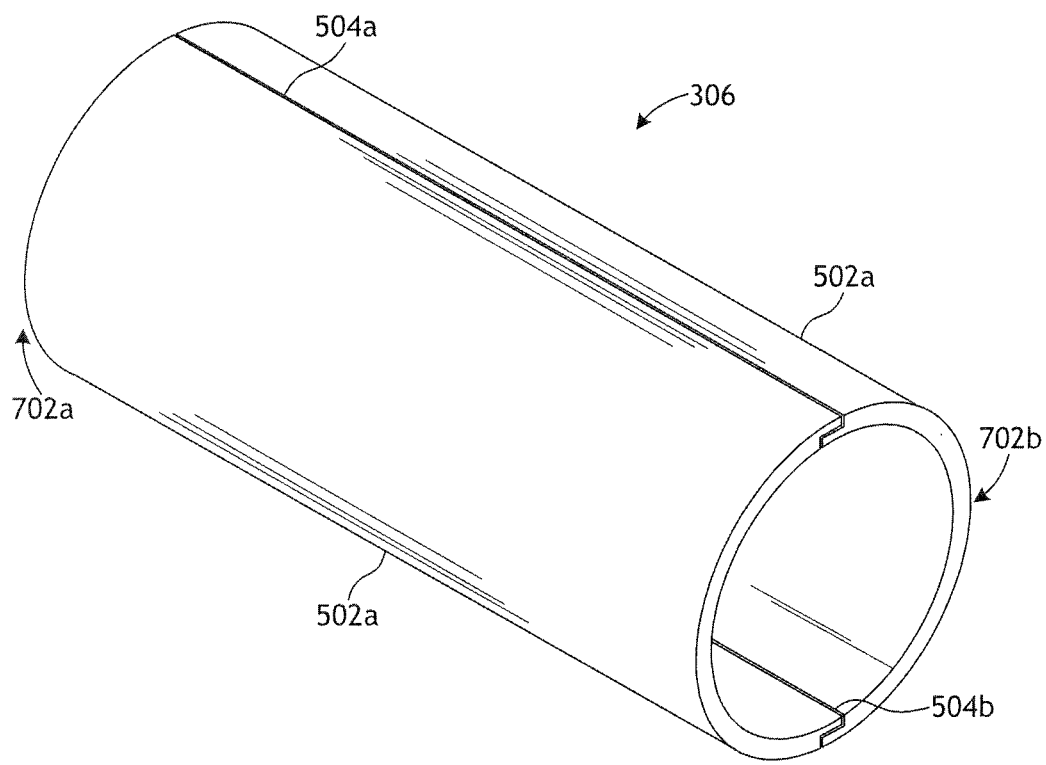
FIG. 10A is an isometric view of another example embodiment of the bobbin of FIG. 4.

FIG. 10A is an isometric view of yet another example embodiment of the bobbin 306 of FIG. 4, according to one or more embodiments of the disclosure. In the illustrated embodiment, the arcuate first and second bobbin portions 502a,b form the first gap 504a and the second gap 504b 180° offset from the first gap 504a, and the first and second gaps 504a,b extend axially between the first and second axial ends 702a,b of the bobbin 306.

Figure 10B:
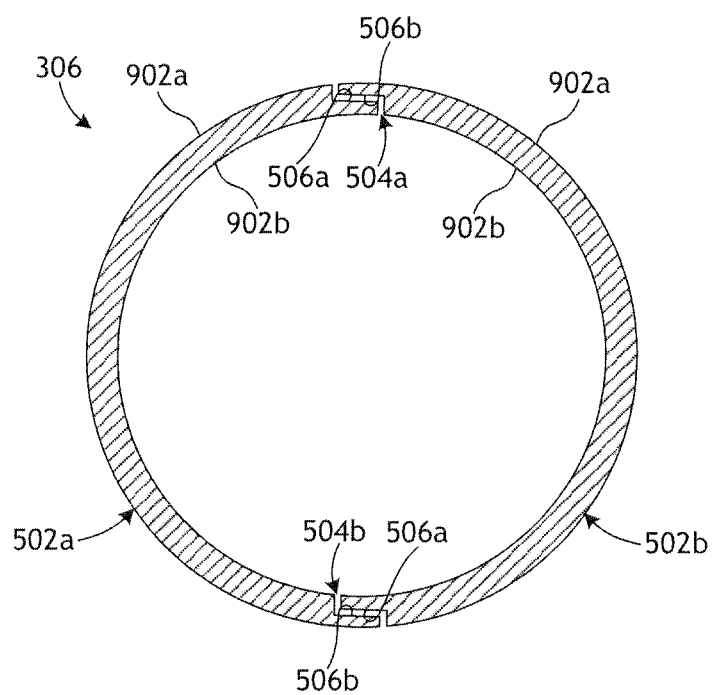
FIG. 10B is a cross-sectional end view of the bobbin of FIG. 10A.

FIG. 10B is a cross-sectional end view of the bobbin 306 of FIG. 10A. Similar to the first and second gaps 504a,b of FIGS. 9A and 9B, the opposing arc ends 506a,b of the bobbin portions 502a,b overlap in the radial direction. Unlike the arc ends 506a,b of FIGS. 9A-9B, however, the arc ends 506a,b in FIGS. 10A-10B are stepped and otherwise define an offset overlap cut through the body of the bobbin 306. Consequently, the stepped arc ends 506a,b overlap in the radial direction. This may prove advantageous during operation since, as the bobbin 306 radially expands and the gaps 504a,b begin to separate, the overlapping stepped arc ends 506a,b will continue to occlude the gaps 504a,b in the radial direction, and thereby prevent the protective layer 414 (FIG. 4) from extruding into the gaps 504a,b. Rather, the gaps 504a,b form a tortuous flow path for the material of the protective layer 414.

Embodiments disclosed herein include:

A. An antenna assembly that includes a bobbin including arcuate first and second bobbin portions positioned about a tool mandrel, a protective layer formed about the first and second bobbin portions, and a cover occluding a portion of an axially extending gap defined between the first and second bobbin portions to prevent the protective layer from extruding into the gap.

B. A method that includes introducing a wellbore logging tool into a wellbore, the wellbore logging tool including a tool mandrel, a bobbin including arcuate first and second bobbin portions positioned about the tool mandrel and cooperatively defining an axially extending gap, a coil wrapped about an outer circumference of the first and second bobbin portions, and a protective layer formed about the coil and the first and second bobbin portions to provide a pressure barrier. The method further including preventing the protective layer from extruding into the axially extending gap, and obtaining measurements of a surrounding subterranean formation with the wellbore logging tool.

Each of embodiments A and B may have one or more of the following additional elements in any combination: Element 1: wherein the bobbin provides a first axial end and a second axial end and the cover extends between the first and second axial ends. Element 2: wherein the cover comprises a material having a coefficient of thermal expansion (CTE) that is the same as or less than a CTE of the bobbin. Element 3: wherein the cover comprises a material selected from the group consisting of a non-magnetic metal, a high temperature plastic, a thermoplastic, a polymer, a ceramic, an epoxy material, a composite material, an advanced composite, and any combination thereof. Element 4: further comprising a longitudinal channel defined in an outer surface of the bobbin to receive and seat the cover. Element 5: wherein the cover is secured within the longitudinal channel using at least one of a coil wrapped about the outer surface of the bobbin, a cord wrapped about the outer surface of the bobbin, an epoxy, and one or more mechanical fasteners. Element 6: wherein the cover has a curved outer surface and a planar inner surface. Element 7: wherein the cover has a curved outer surface and a non-planar inner surface. Element 8: wherein the non-planar inner surface comprises at least one of a radial extension receivable within the gap, angled portions provided at opposing first and second sides of the cover, and one or more castellations extending radially from the non-planar inner surface. Element 9: wherein the cover comprises a first cover portion that occludes a first portion of the gap and a second cover portion that occludes a second portion of the gap, and wherein the first and second cover portions are axially separated by a coil wrapped about an outer circumference of the bobbin. Element 10: wherein the cover is a first cover and the gap is a first gap, the antenna assembly further comprising a second cover positioned on the bobbin to occlude at least a portion of a second axially extending gap defined between the first and second bobbin portions, wherein the second cover prevents the protective layer from extruding into the second gap. Element 11: further comprising a coil including a plurality of windings wrapped about the bobbin along at least a portion of an outer circumference of the bobbin.

Element 12: wherein preventing the protective layer from extruding into the axially extending gap comprises selecting a material for the bobbin that has a coefficient of thermal expansion (CTE) the same as or less than a CTE of the tool mandrel. Element 13: wherein preventing the protective layer from extruding into the axially extending gap comprises wrapping a cord about the outer circumference of the bobbin, and constraining the bobbin against radial expansion with the cord and thereby limiting a size of the gap. Element 14: wherein the cord comprises a material having a coefficient of thermal expansion (CTE) lower than a CTE of the tool mandrel and the bobbin. Element 15: wherein preventing the protective layer from extruding into the axially extending gap comprises positioning a cover on the bobbin to occlude at least a portion of the axially extending gap. Element 16: wherein the axially extending gap is formed at an interface between a first arc end of the first bobbin portion and a second arc end of the second bobbin portion, and wherein preventing the protective layer from extruding into the axially extending gap comprises overlapping the first and second arc ends in a radial direction. Element 17: wherein the tool mandrel is operatively coupled to a drill string and introducing the wellbore logging tool into the wellbore further comprises extending the wellbore logging tool into the wellbore on the drill string, and drilling a portion of the wellbore with a drill bit secured to a distal end of the drill string. Element 18: wherein introducing the wellbore logging tool into the wellbore further comprises extending the wellbore logging tool into the wellbore on wireline as part of a wireline instrument sonde.

By way of non-limiting example, exemplary combinations applicable to A and B include: Element 4 and Element 5; and Element 13 and Element 14.

Another example antenna assembly includes a bobbin including at least a first arcuate bobbin portion and a second arcuate bobbin portion positioned about an outer surface of a tool mandrel and a protective layer formed about the bobbin. A cord is wrapped about the outer circumference of the bobbin and constrains the bobbin against radial expansion and thereby limits a size of the gap. The cord comprises a material having a coefficient of thermal expansion (CTE) lower than a CTE of the tool mandrel and the bobbin.

Another example antenna assembly includes a bobbin including at least a first arcuate bobbin portion and a second arcuate bobbin portion positioned about an outer surface of a tool mandrel and a protective layer formed about the bobbin. The axially extending gap is formed at an interface between a first arc end of the first bobbin portion and a second arc end of the second bobbin portion. The protective layer is prevented from extruding into the axially extending gap by overlapping the first and second arc ends in a radial direction.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. An antenna assembly, comprising:
 a bobbin including arcuate first and second bobbin portions positioned about a tool mandrel;
 a protective layer formed about the first and second bobbin portions; and a cover between the bobbin and the protective layer, the cover extending partially across an outer circumference of the bobbin and occluding a portion of an axially extending gap defined between the first and second bobbin portions to prevent the protective layer from extruding into the gap.

2. The antenna assembly of claim 1, wherein the bobbin comprises a first axial end and a second axial end and the cover extends between the first and second axial ends.

3. The antenna assembly of claim 1, wherein the cover comprises a material having a coefficient of thermal expansion (CTE) less than or equal to a CTE of the bobbin.

4. The antenna assembly of claim 1, wherein the cover comprises a material selected from the group consisting of a non-magnetic metal, a high temperature plastic, a thermoplastic, a polymer, a ceramic, an epoxy material, a composite material, an advanced composite, and any combination thereof.

5. The antenna assembly of claim 1, further comprising a longitudinal channel defined in an outer surface of the bobbin to receive and seat the cover.

6. The antenna assembly of claim 5, wherein the cover is secured within the longitudinal channel using at least one of a coil wrapped about the entire outer circumference of the bobbin, a cord wrapped about the outer surface of the bobbin, an epoxy, and one or more mechanical fasteners.

7. The antenna assembly of claim 1, wherein the cover has a curved outer surface and a planar inner surface.

8. The antenna assembly of claim 1, wherein the cover has a curved outer surface and a non-planar inner surface.

9. The antenna assembly of claim 8, wherein the non-planar inner surface comprises at least one of a radial extension receivable within the gap, angled portions provided at opposing first and second sides of the cover, and one or more castellations extending radially from the non-planar inner surface.

10. The antenna assembly of claim 1, wherein the cover comprises a first cover portion that occludes a first portion of the gap and a second cover portion that occludes a second portion of the gap, and wherein the first and second cover portions are axially separated by a coil wrapped about an outer circumference of the bobbin .

11. The antenna assembly of claim 1, wherein the cover is a first cover and the gap is a first gap, the antenna assembly further comprising:
a second cover positioned on the bobbin to occlude at least a portion of a second axially extending gap defined between the first and second bobbin portions, wherein the second cover prevents the protective layer from extruding into the second gap.

12. The antenna assembly of claim 1, further comprising a coil including a plurality of windings wrapped about the bobbin along at least a portion of an outer circumference of the bobbin.

13. A method, comprising:
introducing a wellbore logging tool into a wellbore, the wellbore logging tool including:
a tool mandrel;
a bobbin including arcuate first and second bobbin portions positioned about the tool mandrel and cooperatively defining an axially extending gap;
a coil wrapped about an entire outer circumference of the first and second bobbin portions; and
a protective layer formed about the coil and the first and second bobbin portions to provide a pressure barrier;
preventing the protective layer from extruding into the axially extending gap with a cover extending partially across an outer circumference of the bobbin between the bobbin and the protective layer; and
obtaining measurements of a surrounding subterranean formation with the wellbore logging tool.

14. The method of claim 13, wherein preventing the protective layer from extruding into the axially extending gap comprises selecting a material for the bobbin that has a coefficient of thermal expansion (CTE) the same as or less than a CTE of the tool mandrel.

15. The method of claim 13, wherein preventing the protective layer from extruding into the axially extending gap comprises :
wrapping a cord about the outer circumference of the bobbin; and
constraining the bobbin against radial expansion with the cord and thereby limiting a size of the gap.

16. The method of claim 15, wherein the cord comprises a material having a coefficient of thermal expansion (CTE) lower than a CTE of the tool mandrel and the bobbin.

17. The method of claim 13, wherein preventing the protective layer from extruding into the axially extending gap comprises positioning the cover on the bobbin to occlude at least a portion of the axially extending gap, wherein the cover interposes the bobbin and the protective layer.

18. The method of claim 13, wherein the axially extending gap is formed at an interface between a first arc end of the first bobbin portion and a second arc end of the second bobbin portion, and wherein preventing the protective layer from extruding into the axially extending gap comprises overlapping the first and second arc ends in a radial direction.

19. The method of claim 13, wherein the tool mandrel is operatively coupled to a drill string and introducing the wellbore logging tool into the wellbore further comprises:
extending the wellbore logging tool into the wellbore on the drill string; and
drilling a portion of the wellbore with a drill bit secured to a distal end of the drill string.

20. The method of claim 13, wherein introducing the wellbore logging tool into the wellbore further comprises extending the wellbore logging tool into the wellbore on wireline as part of a wireline instrument sonde.

\* \* \* \* \*